United States Patent [19]
Kimura

[11] Patent Number: 5,239,516
[45] Date of Patent: Aug. 24, 1993

[54] ULTRASONIC GROUND SPEEDOMETER UTILIZING DOPPLER EFFECT OF ULTRASONIC WAVES

[75] Inventor: Toshiya Kimura, Yokosuka, Japan

[73] Assignee: Nissan Motor Co., Ltd., Yokohama, Japan

[21] Appl. No.: 942,063

[22] Filed: Sep. 9, 1992

[30] Foreign Application Priority Data

Sep. 9, 1991 [JP] Japan .................................. 3-257103

[51] Int. Cl.$^5$ ............................................. G01S 15/60
[52] U.S. Cl. .................................................... 367/91
[58] Field of Search .......................................... 367/91

[56] References Cited

U.S. PATENT DOCUMENTS

| | | | |
|---|---|---|---|
| 4,065,745 | 12/1977 | Robinson | 367/91 |
| 5,054,003 | 10/1991 | Kobayashi et al. | 367/91 |
| 5,097,453 | 3/1992 | Kobayashi et al. | 367/91 |

Primary Examiner—Daniel T. Pihulic
Attorney, Agent, or Firm—Lowe, Price, LeBlanc & Becker

[57] ABSTRACT

An ultrasonic ground speedometer utilizing Doppler effect of ultrasonic waves comprises an ultrasonic transmitter for outputting an ultrasonic wave at an emitting angle against a road surface, an ultrasonic receiver for receiving a reflected ultrasonic wave caused by reflection of the output ultrasonic wave from the road surface, a signal processor for deriving a Doppler shift frequency between the frequencies of the output ultrasonic wave from the ultrasonic transmitter and the reflected ultrasonic wave received by the ultrasonic receiver, a first arithmetic circuit for deriving the angle difference between the emitting angle and the reception angle defined between the road surface and the propagation direction of the reflected ultrasonic wave received by the receiver, on the basis of the Doppler shift frequency, and a calculating circuit for calculating a ground speed of the vehicle, on the basis of both the Doppler shift frequency and the angle difference.

13 Claims, 11 Drawing Sheets

ULTRASONIC GROUND SPEEDOMETER UTILIZING DOPPLER EFFECT OF ULTRASONIC WAVES

BACKGROUND OF THE INVENTION

1. Field of the Invention

The present invention relates to an ultrasonic ground speedometer utilizing the Doppler effect of ultrasonic waves, which is, for example, adapted for detection of vehicle speed over the ground, and specifically to a speedometer being capable of providing a high accuracy of ground speed measurement over the en&ire ground velocity range to be measured.

2. Description of the Prior Disclosure

Recently, there have been proposed and developed various ultrasonic Doppler speed measurement devices. One such conventional ultrasonic Doppler ground speedometer has been disclosed in U.S. Pat. No. 5,054,003 issued on Oct. 1, 1991 (corresponding to Japanese Patent Application No. 1-107319) and U.S. Pat. No. 5,097,453 issued on Mar. 17, 1992 (corresponding to Japanese Patent Application No. 1-107320). As shown in FIG. 1, the above-mentioned conventional ultrasonic Doppler ground speedometer generally includes an oscillator 1 for generating an output signal having a particular wavelength within a wavelength range of 2.6 mm to 3.4 mm essentially corresponding to an oscillator output frequency range of 131 kHz to 100 kHz, an echo sounder transmitter 3 for transmitting an ultrasonic wave having the above noted particular wavelength, and a drive circuit 2 for amplifying the oscillator output signal and for driving the echo sounder transmitter 3 by the amplified signal output therefrom. The transmitter 3 emits an ultrasonic wave 4 with the previously noted particular wavelength in a vehicle forward direction at a predetermined emitting angle against a road surface 5. The conventional ground speedometer also includes an ultrasonic receiver 6 for receiving a reflected ultrasonic wave caused by reflection of the output ultrasonic wave on the road surface 5, and for generating a reflected ultrasonic wave signal. In the prior art ground speedometers, the ultrasonic transmitter 3 and the ultrasonic receiver 6 are both arranged on the same plane. In FIG. 1, reference numeral 7 denotes an amplifier for amplifying the reflected ultrasonic wave signal. The conventional ultrasonic ground speedometer also comprises a signal processor including a multiplier 8 for deriving the frequency difference between the oscillator output signal frequency and the reflected ultrasonic wave signal frequency by multiplying both of the frequencies, a low-pass filter 9 for filtering undesirable noise from the frequency difference signal generated from the multiplier 8, a zero-crossing comparator 10 for waveform-shaping the filtered frequency difference signal representative of the Doppler shift, a pulse counter 11 for counting pulses in the Doppler shift signal from the comparator 10 and for deriving a Doppler frequency, and an arithmetic circuit 12 serving as a Doppler frequency/ground speed convertor for deriving the ground speed on the basis of the output from the pulse counter 11, representative of the Doppler frequency. A frequency controller 13 is also provided for controlling the oscillator output frequency on the basis of the output signal generated from the arithmetic circuit 12 in such a manner as to keep the reflected ultrasonic wave frequency represented by the sum of the output ultrasonic wave frequency and the Doppler shift to a constant value in response to change in the ground speed derived by the arithmetic circuit.

FIG. 2 shows a principle of the ultrasonic Doppler ground speed measurement of the conventional ultrasonic ground speedometer, in which $f_o$, $f_d$ and F respectively designate an output ultrasonic wave frequency emitted from the transmitter 3, a Doppler shift, and a received ultrasonic wave frequency received by the ultrasonic receiver 6. The received ultrasonic frequency F is equivalent to the sum of the output ultrasonic wave frequency $f_o$ and the Doppler shift $f_d$. In the previously described conventional ultrasonic ground speedometers, the ground velocity is derived on the assumption that the transmitter 3 and the receiver 6 are both arranged on the same plane and in addition an emitting angle defined by the emitting direction of the output ultrasonic wave and the road surface is equal to a reception angle defined by the reflected direction of the reflected ultrasonic wave and the road surface. As is generally known, supposing that the acoustic velocity represented by c, the arithmetic circuit 12 employed in the conventional ground speedometer derives the ground velocity v from the Doppler frequency $f_d$ according to the following equation.

$$v = cf_d/(2F - f_d)\cos\theta$$

As appreciated from the above equation, since the emitting angle $\theta$ is preset to a predetermined angle, the ground velocity v can be calculated by deriving the two values, namely the Doppler shift frequency $f_d$ and the received ultrasonic frequency F.

However, there is a problem that linearity of the calculated ground speed to the actual ground speed is deteriorated at a high speed range, since the calculated ground speed is derived on the assumption that the emitting angle $\theta$ of the output ultrasonic wave is identical to the reception angle of the reflected ultrasonic wave. That is, since the above assumption is not satisfied at the high vehicle speed range, the difference between the actual vehicle speed and the calculated ground speed tends to become greater according to the increase in velocity at the high speed range in which the vehicle speed substantially approaches to the acoustic velocity.

Referring now to FIG. 3, there is shown a linearity of the calculated ground speed derived by the conventional ultrasonic Doppler ground speedometer with respect to the reference ground speed measured with a spatial filter type ground speedometer. In general, such a spatial filter type ground speedometer can measure the vehicle ground speed with a considerably high measurement accuracy of ±0.5 km/h. In the case of test results illustrating the linearity of the calculated ground speed of FIG. 3, the emitting angle $\theta$ is preset to 45°. As will be appreciated from the graph of FIG. 3, the linearity of the calculated ground speed to the measured reference ground speed is deteriorated at a high speed range of 90 km/h or more. The calculated value of ground speed is 160 km/h at the reference ground speed of 180 km/h. In such an excessively high speed range of 180 km/h, there is an error of approximately 20 km/h, resulting from the previously noted assumption.

SUMMARY OF THE INVENTION

It is, therefore, an object of the present invention to provide an ultrasonic ground speedometer utilizing Doppler effect, which can provide a high accuracy of ground speed measurement over the entire ground velocity range to be measured.

It is another object of the invention to provide an ultrasonic ground speedometer utilizing Doppler effect, which can precisely compensate the angle relationship between an emitting angle of an output ultrasonic wave generated by an ultrasonic transmitter and a reception angle of a reflected ultrasonic wave received by an ultrasonic receiver.

It is a further object of the invention to provide an ultrasonic ground speedometer utilizing Doppler effect, which can provide a S/N ratio of Doppler frequency signal representative of Doppler shift between an output ultrasonic wave generated by an ultrasonic transmitter and a reflected ultrasonic wave received by an ultrasonic receiver.

It is a still further object of the invention to provide an optimal arrangement of an ultrasonic transmitter and an ultrasonic receiver both employed in an ultrasonic ground speedometer utilizing Doppler effect, for insuring a high sensitivity of the ultrasonic receiver.

In order to accomplish the aforementioned and other objects, an ultrasonic ground speedometer utilizing Doppler effect of ultrasonic waves, comprises ultrasonic transmitting means for outputting an ultrasonic wave at an emitting angle against a road surface, ultrasonic receiving means for receiving a reflected ultrasonic wave caused by reflection of the output ultrasonic wave from the road surface, means for deriving a Doppler shift frequency between the frequencies of the output ultrasonic wave from the ultrasonic transmitting means and the reflected ultrasonic wave received by the ultrasonic receiving means, first arithmetic means for deriving a first angle difference between the emitting angle and a reception angle defined between the road surface and a propagation direction of the reflected ultrasonic wave received by the ultrasonic receiving means, on the basis of the Doppler shift frequency, and calculation means for calculating a ground speed of a vehicle mounting the ultrasonic ground speedometer, on the basis of both the Doppler shift frequency and the first angle difference. The ultrasonic ground speedometer may further comprise second arithmetic means for compensating the emitting angle depending on the ground speed. The second arithmetic means compensates the emitting angle by a second angle difference between an actual emitting angle obtained in a vehicle running state and a preset emitting angle obtained in a vehicle stopped state. The second arithmetic means derives the second angle difference, on the basis of the Doppler shift frequency. The first arithmetic means derives the first angle difference based on the Doppler shift frequency from a predetermined first-angle-difference/Doppler-shift-frequency characteristic data stored in a first memory, while the second arithmetic means derives the second angle difference based on the Doppler shift frequency from a predetermined second-angle-difference/Doppler-shift-frequency characteristic data stored in a second memory.

According to another aspect of the invention, an ultrasonic ground speedometer utilizing Doppler effect of ultrasonic waves, for an automotive vehicle comprises ultrasonic transmitting means for outputting an ultrasonic wave at a preset emitting angle against a road surface, in the vehicle forward direction, the preset emitting angle corresponding to an actual emitting angle obtained in a vehicle stopped state, ultrasonic receiving means for receiving a reflected ultrasonic wave caused by reflection of the output ultrasonic wave from the road surface, means for deriving a Doppler shift frequency between the frequencies of the output ultrasonic wave from the ultrasonic transmitting means and the reflected ultrasonic wave received by the ultrasonic receiving means, first arithmetic means for deriving a first angle difference between the preset emitting angle and a reception angle defined between the road surface and a propagation direction of the reflected ultrasonic wave received by the ultrasonic receiving means, on the basis of the Doppler shift frequency, and calculation means for calculating a ground speed of the vehicle mounting the ultrasonic ground speedometer, on the basis of both the Doppler shift frequency and the first angle difference. An emitting point of the ultrasonic transmitting means and a reception point of the ultrasonic receiving means are spaced apart from each other by a predetermined distance. In addition, the reception point of the ultrasonic receiving means is arranged backwardly of the emitting point of the ultrasonic transmitting means in the vehicle forward direction. It is preferable that an ultrasonic emitting point of the ultrasonic transmitting means and an ultrasonic reception surface including the reception point of the ultrasonic receiving means are both inclined in the vehicle forward direction with a predetermined inclination, and the ultrasonic reception surface is arranged backwardly of the ultrasonic emitting surface in the vehicle forward direction, so as to provide a high S/N ratio for the Doppler shift indicative signal.

According to a further aspect of the invention, an ultrasonic ground speedometer utilizing Doppler effect of ultrasonic waves, for an automotive vehicle comprises ultrasonic transmitting means for outputting an ultrasonic wave at a preset emitting angle against a road surface, in the vehicle forward direction, the preset emitting angle corresponding to an actual emitting angle obtained in a vehicle stopped state, ultrasonic receiving means for receiving a reflected ultrasonic wave caused by reflection of the output ultrasonic wave from the road surface, means for deriving a Doppler shift frequency between the frequencies of the output ultrasonic wave from the ultrasonic transmitting means and the reflected ultrasonic wave received by the ultrasonic receiving means, first arithmetic means for deriving a first angle difference between an actual emitting angle and a reception angle defined between the road surface and a propagation direction of the reflected ultrasonic wave received by the ultrasonic receiving means, on the basis of the Doppler shift frequency, second arithmetic means for compensating the actual emitting angle depending on the ground speed, the second arithmetic means compensating the actual emitting angle by a second angle difference between the actual emitting angle obtained in a vehicle running state and a preset emitting angle obtained in a vehicle stopped state, the second arithmetic means deriving the second angle difference, on the basis of the Doppler shift frequency, and calculation means for calculating a ground speed of the vehicle mounting the ultrasonic ground speedometer, on the basis of the Doppler shift frequency, the first angle difference and the second angle difference. An emitting point of the ultrasonic transmitting means and a reception point of the ultrasonic receiving means are spaced apart from each other by a predetermined distance and the reception point of the ultrasonic receiving means is arranged backwardly of the emitting point of the ultrasonic transmitting means in the vehicle forward direction. An ultrasonic emitting surface including the emitting point of the ultrasonic transmitting means and an ultrasonic reception surface including the reception point of the ultrasonic receiving means are both inclined in the vehicle forward direction with a predetermined inclination, and in addition the ultrasonic reception surface and the ultrasonic emitting surface are both arranged on the same plane.

The ultrasonic transmitting means may include an oscillator for generating the output signal having a predetermined wavelength range, an ultrasonic transducer for converting electric signals to acoustical signals and for emitting the output ultrasonic wave having the particular wavelength, and a drive circuit for amplifying the oscillator output signal and for driving the ultrasonic transducer via the amplified signal therefrom, and the ultrasonic receiving means may include an ultrasonic transducer for receiving the reflected ultrasonic wave and for converting acoustical signals to electric signals. The ultrasonic transducer is preferably comprised of a piezoelectric crystal unit. The ultrasonic transducer for the ultrasonic receiving means is preferably comprised of a high resonance characteristic ultrasonic transducer.

DESCRIPTION OF THE PREFERRED EMBODIMENTS

First Embodiment

Figure 6:
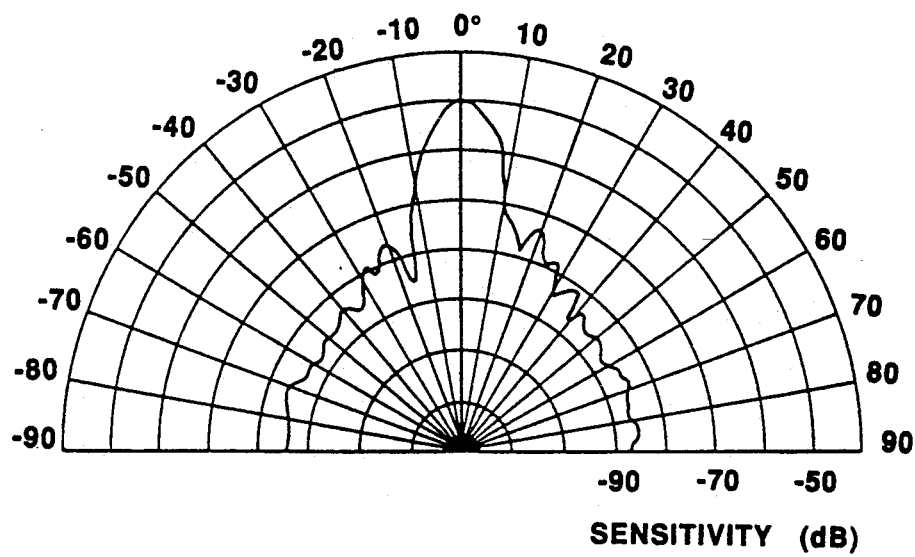
FIG. 6 is a drawing illustrating one directional pattern of the ultrasonic receiver being applicable for the ultrasonic Doppler ground speedometer of the invention.
Figure 7:
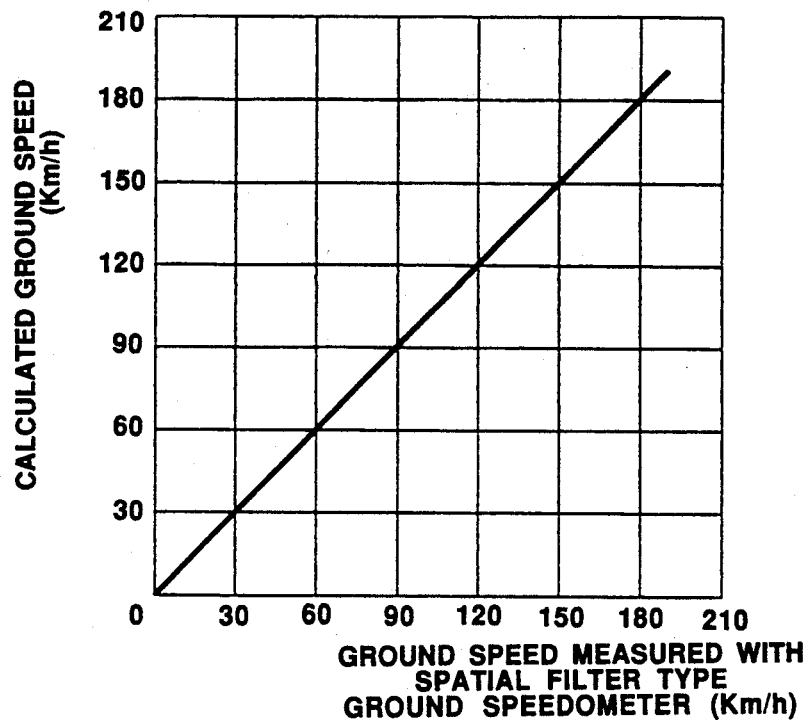
FIG. 7 is a graph illustrating a linearity of a calculated ground speed of the ultrasonic Doppler speedometer of the first embodiment to a ground speed measured with a spatial filter type ground speedometer.
Figure 8:
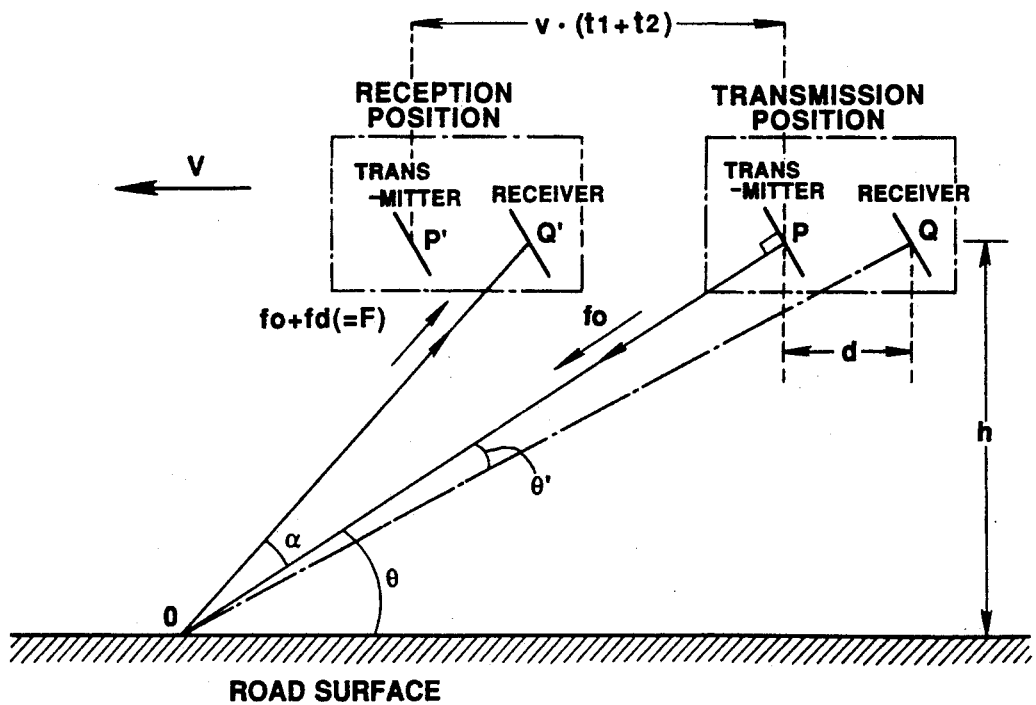
FIG. 8 is a drawing representing a principle of measuring method of the ultrasonic ground speedometer of the first embodiment.

Referring now to FIGS. 4 through 9, particularly to FIG. 8, the ultrasonic Doppler ground speedometer of the first embodiment is designed on the assumption that an emitting angle of an output ultrasonic wave emitted from an ultrasonic transmitter is different from a reception angle of a reflected ultrasonic wave reflected from the road surface and received by an ultrasonic receiver, and in addition the emitting angle is not influenced by the vehicle speed. In FIG. 8, a received ultrasonic wave frequency F is defined as the sum of an output ultrasonic wave frequency $f_o$ and the Doppler shift frequency $f_d$, i.e., $f_o + f_d$ and v designates a vehicle velocity. As in FIG. 8, during measurement of ground speed of the vehicle, the ultrasonic transmitter/receiver unit is actually displaced from the right position (viewing FIG. 8) wherein the output ultrasonic wave is emitted from an emitting point P of the ultrasonic transmitter to the left position wherein the reflected ultrasonic wave is received by the ultrasonic receiver at a reception point Q'. The right position will be hereinafter referred to as a "transmission position", while the left position will be hereinafter referred to as a "reception position". As seen from the transmission position or the reception position, the emitting point P or P' and the reception point Q or Q' are spaced apart from each other by a distance d. Both the emitting point and the reception point are set at the same level h with respect to the road surface. Assuming that the propagation of the ultrasonic wave is similar to that of light beam, and the emitting angle $\theta$ is not influenced by the vehicle speed, the output ultrasonic wave is reflected from a reflection point O on the road surface with the emitting angle $\theta$. An angle $\alpha$ represents the angle difference between the emitting angle $\theta$ and the reception angle defined between the propagation direction of received ultrasonic wave and the road surface. In other words, the reception angle is obtained by the sum of the angle $\alpha$ and the emitting angle $\theta$, i.e., $(\theta + \alpha)$. $\theta'$ represents an angle between two line segments OP and OQ and corresponds to the value of the angle $\alpha$ when the vehicle speed v is equal to zero. A time $t_1$ corresponds to a propagation time from the emitting point P to the reflection point O, while a time $t_2$ corresponds to a propagation time from the reflection point O to the reception point Q'.

In the ultrasonic Doppler ground speedometer of the first embodiment shown in FIG. 8, the Doppler shift frequency $f_d$ is obtained by the following equation.

$$f_d = v\{\cos\theta + \cos(\theta + \alpha)\}F/\{c + v\cos(\theta + \alpha)\} \quad (1)$$

As appreciated from the above equation (1), the Doppler shift frequency $f_d$ is represented as a function of the angle difference $\alpha$ as well as the vehicle speed v. Furthermore, as will be appreciated from FIG. 8, the angle difference α varies depending on the vehicle speed v. Since the Doppler shift frequency $f_d$ can be measured and calculated by the ground speedometer of the first embodiment, the ground velocity v of the vehicle is easily derived by determining the relationship between the angle difference c and the Doppler shift frequency $f_d$.

As shown in FIG. 8, the ultrasonic transmitter/receiver unit is displaced from the transmission position to the reception position by a distance $v(t_1+t_2)$, in one cycle of ground speed measurement. With the above noted arrangement of the ultrasonic transmitter/receiver unit, since the reception point is backwardly offset from the emitting point by the distance d, the distance between the actual emitting point in the transmission position and the actual reception point shifted from the transmission position to the reception position is represented by the following equation.

$$v(t_1+t_2)-d=(\cos\theta/\sin\theta)h-\{\cos(\theta+\alpha)/\sin(\theta+\alpha)\}h$$

The propagation times $t_1$ and $t_2$ can be geometrically obtained from FIG. 8, as follows.

$$t_1=h/c\sin\theta,\ t_2=h/c\sin(\theta+\alpha)$$

wherein, c represents an acoustic velocity. On the basis of the above three equations, the following equation is derived.

$$v\{h/c\sin\theta+h/c\sin(\theta+\alpha)\}-d=(\cos\theta/\sin\theta)h-\{\cos(\theta+\alpha)/\sin(\theta+\alpha)\}h$$

Subsequently, the distance d between the transmitter and the receiver can be geometrically obtained from FIG. 8, as follows.

$$d=h/\tan(\theta-\theta')-h/\tan\theta$$

The following equation is derived by substituting the above distance d into the right side of the previously derived equation.

$$v\{\sin(\theta+\alpha)+\sin\theta\}-c\sin\theta\sin(\theta+\alpha)\cot(\theta-\theta')+c\sin\theta\cos(\theta+\alpha)=0 \quad (2)$$

In the above equation (2), the ground velocity v is included only in a first term $v\{\sin(\theta+\alpha) + \sin\theta\}$56 but not in a second term $c\sin\theta\sin(\theta+\alpha)\cot(\theta-\theta')$ and a third term $c\sin\theta\cos(\theta+\alpha)$. Therefore, the ground velocity v can be calculated on the basis of the above equation, assuming that the angle difference α is univocally determined from a predetermined relationship between the angle difference α and the Doppler shift frequency $f_d$ represented by the previously noted equation (1), i.e., $f_d = v\{\cos\theta+\cos(\theta+\alpha)\}F / \{c+v\cos(\theta+\alpha)\}$. Since the equations (1) and (2) respectively include a term of the acoustic velocity c, such as the second and third terms of the equation (2), the equations (1) and (2) are dependent on air temperature, because of the acoustic velocity c itself being a function of air temperature. For example, the relationship between the angle difference α and the vehicle speed v varies depending on change in the acoustic velocity c. The following tables 1, 2, 3 and 4 represent the relationship between the vehicle speed v, the angle difference α and the Doppler shift frequency $f_d$, at four air temperatures of −25° C., 0° C., 25° C., and 50° C., respectively. These test results shown in the tables 1 through 4 are experimentally assured by the inventors of the invention. These tests are made under a particular test condition in which the emitting angle θ of an output ultrasonic wave is set at a particular angle of 45° and the received ultrasonic wave frequency F is controlled to be kept at a particular frequency of 130 kHz by means of an output ultrasonic wave frequency controller disclosed in the previously described U.S. Pat. Nos. 5,054,003 or 5,097,453 entitled "ULTRASONIC GROUND SPEEDOMETER UTILIZING DOPPLER EFFECT". The disclosure of the above-identified U.S. Patents respectively assigned to the same assignee as the invention is herein incorporated by reference for the sake of disclosure. The setting value 130 kHz of the received ultrasonic wave frequency F is determined according to the teaching of the above U.S. Patents, as as to assure the highest possible S/N ratio of a Doppler shift signal. As described in the above U.S. Pat. Nos. 5,054,003 or 5,097,453, a frequency controller which is hereinafter described in detail is employed in the ground speedometer, for varying the output ultrasonic wave frequency output from the transmitter within a particular frequency range of 100 kHz to 131 kHz, so as to keep the received ultrasonic wave frequency at a constant value (130 kHz).

TABLE 1

| | (−25° C.) | |
|---|---|---|
| v(km/h) | α(deg) | fd(kHz) |
| 0 | −7.18486 | 0 |
| 10 | −6.605 | 1.69143 |
| 20 | −6.01814 | 3.34583 |
| 30 | −5.42408 | 4.96395 |
| 40 | −4.82286 | 6.54652 |
| 50 | −4.21422 | 8.09426 |
| 60 | −3.59813 | 9.60783 |
| 70 | −2.97444 | 11.0879 |
| 80 | −2.34307 | 12.535 |
| 90 | −1.70394 | 13.9498 |
| 100 | −1.05687 | 15.3328 |
| 110 | −0.401718 | 16.6846 |
| 120 | 0.261482 | 18.0056 |
| 130 | 0.933033 | 19.2964 |
| 140 | 1.61288 | 20.5574 |
| 150 | 2.3013 | 21.789 |
| 160 | 2.99832 | 22.9917 |
| 170 | 3.70409 | 24.1658 |
| 180 | 4.41867 | 25.3117 |
| 190 | 5.14232 | 26.4297 |
| 200 | 5.87499 | 27.5202 |
| 210 | 6.61697 | 28.5834 |
| 220 | 7.36831 | 29.6196 |
| 230 | 8.1291 | 30.6291 |
| 240 | 8.89959 | 31.6121 |
| 250 | 9.67981 | 32.5687 |

TABLE 2

| | (0° C.) | |
|---|---|---|
| v(km/h) | α(deg) | fd(kHz) |
| 0 | −7.18481 | 0 |
| 10 | −6.63187 | 1.61427 |
| 20 | −6.07256 | 3.19481 |
| 30 | −5.5067 | 4.74228 |
| 40 | −4.93424 | 6.25732 |
| 50 | −4.35518 | 7.74055 |
| 60 | −3.76926 | 9.19253 |
| 70 | −3.17656 | 10.6139 |
| 80 | −2.57686 | 12.0051 |
| 90 | −1.97011 | 13.3666 |
| 100 | −1.35616 | 14.6991 |
| 110 | −0.734947 | 16.0029 |
| 120 | −0.106419 | 17.2785 |
| 130 | 0.529541 | 18.5264 |
| 140 | 1.17312 | 19.7469 |

TABLE 2-continued (0° C.)

| v(km/h) | α(deg) | fd(kHz) |
|---|---|---|
| 150 | 1.82433 | 20.9404 |
| 160 | 2.48333 | 22.1073 |
| 170 | 3.15019 | 23.248 |
| 180 | 3.825 | 24.3628 |
| 190 | 4.50792 | 25.4519 |
| 200 | 5.19906 | 26.5157 |
| 210 | 5.89855 | 27.5544 |
| 220 | 6.60635 | 28.5684 |
| 230 | 7.3227 | 29.5578 |
| 240 | 8.04771 | 30.5229 |
| 250 | 8.78139 | 31.4638 |

TABLE 3

(25° C.)

| v(km/h) | α(deg) | fd(kHz) |
|---|---|---|
| 0 | −7.18484 | 0 |
| 10 | −6.65638 | 1.54385 |
| 20 | −6.12209 | 3.05684 |
| 30 | −5.58187 | 4.53956 |
| 40 | −5.03566 | 5.99258 |
| 50 | −4.48337 | 7.41642 |
| 60 | −3.92488 | 8.8116 |
| 70 | −3.36015 | 10.1786 |
| 80 | −2.78905 | 11.518 |
| 90 | −2.21162 | 12.8301 |
| 100 | −1.6276 | 14.1154 |
| 110 | −0.03699 | 15.3744 |
| 120 | −0.439754 | 16.6074 |
| 130 | 0.164253 | 17.8149 |
| 140 | 0.775131 | 18.9971 |
| 150 | 1.39296 | 20.1544 |
| 160 | 2.01785 | 21.2873 |
| 170 | 2.64981 | 22.3959 |
| 180 | 3.28905 | 23.4806 |
| 190 | 3.93554 | 24.5417 |
| 200 | 4.58951 | 25.5794 |
| 210 | 5.25088 | 26.594 |
| 220 | 5.91993 | 27.5857 |
| 230 | 6.5966 | 28.5548 |
| 240 | 7.28112 | 29.5014 |
| 250 | 7.97355 | 30.4258 |

TABLE 4

(50° C.)

| v(km/h) | α(deg) | fd(kHz) |
|---|---|---|
| 0 | −7.18481 | 0 |
| 10 | −6.6788 | 1.47931 |
| 20 | −6.16746 | 2.93029 |
| 30 | −5.65063 | 4.35346 |
| 40 | −5.12831 | 5.74931 |
| 50 | −4.60044 | 7.11831 |
| 60 | −4.06693 | 8.46094 |
| 70 | −3.52768 | 9.77761 |
| 80 | −2.98261 | 11.0688 |
| 90 | −2.43172 | 12.3348 |
| 100 | −1.87493 | 13.5761 |
| 110 | −1.31205 | 14.7931 |
| 120 | −0.743134 | 15.9861 |
| 130 | −0.168049 | 17.1555 |
| 140 | 0.413311 | 18.3015 |
| 150 | 1.00098 | 19.4245 |
| 160 | 1.59507 | 20.5249 |
| 170 | 2.19564 | 21.6028 |
| 180 | 2.80272 | 22.6586 |
| 190 | 3.41651 | 23.6925 |
| 200 | 4.03699 | 24.7048 |
| 210 | 4.66427 | 25.6958 |
| 220 | 5.2984 | 26.6655 |
| 230 | 5.93953 | 27.6143 |
| 240 | 6.58777 | 28.5423 |
| 250 | 7.24311 | 29.4497 |

As will be appreciated from the tables 1 through 4, the relationship between the vehicle speed v and the angle difference α varies depending on change in the acoustic velocity c, while the relationship between the angle difference α and the Doppler shift frequency $f_d$ is essentially constant, irrespective of change in the acoustic velocity c. On the basis of the above experimentally obtained test data of the tables 1 through 4, the relationship of the angle difference α versus the Doppler shift frequency $f_d$ is univocally determined by a sole characteristic curve shown in FIG. 9. As set forth above, the ground speed of the vehicle is derived from the measured Doppler shift frequency $f_d$ and the angle difference α read out from the α − $f_d$ characteristic curve of FIG. 9, on the basis of the following equation derived from the previously noted equation (1).

$$v = cf_d / \{F\cos\theta + (F-f_d)\cos(\theta+\alpha)\} \quad (3)$$

Figure 1:
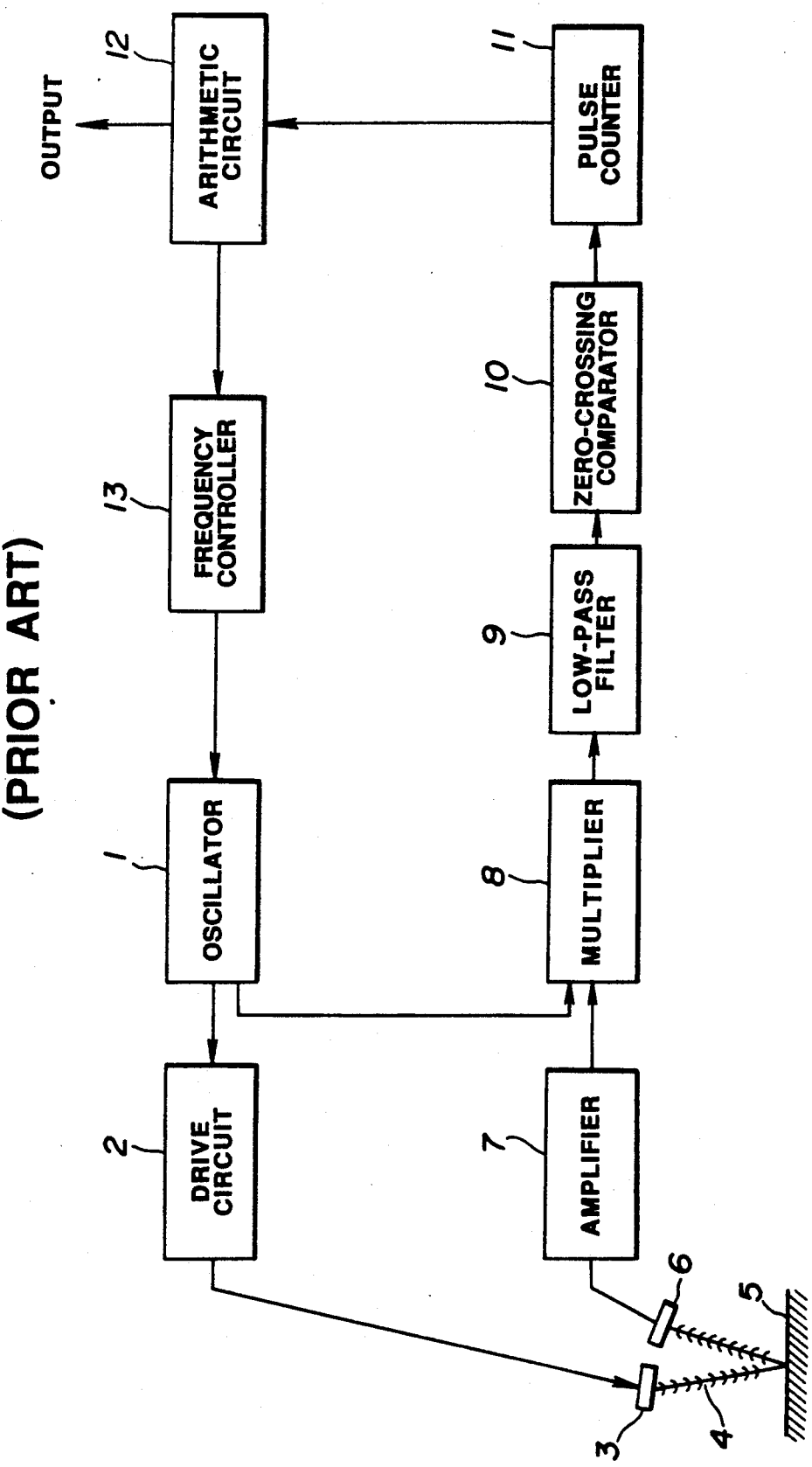
FIG. 1 is a block diagram illustrating an exemplified conventional ultrasonic Doppler ground speedometer.
Figure 4:
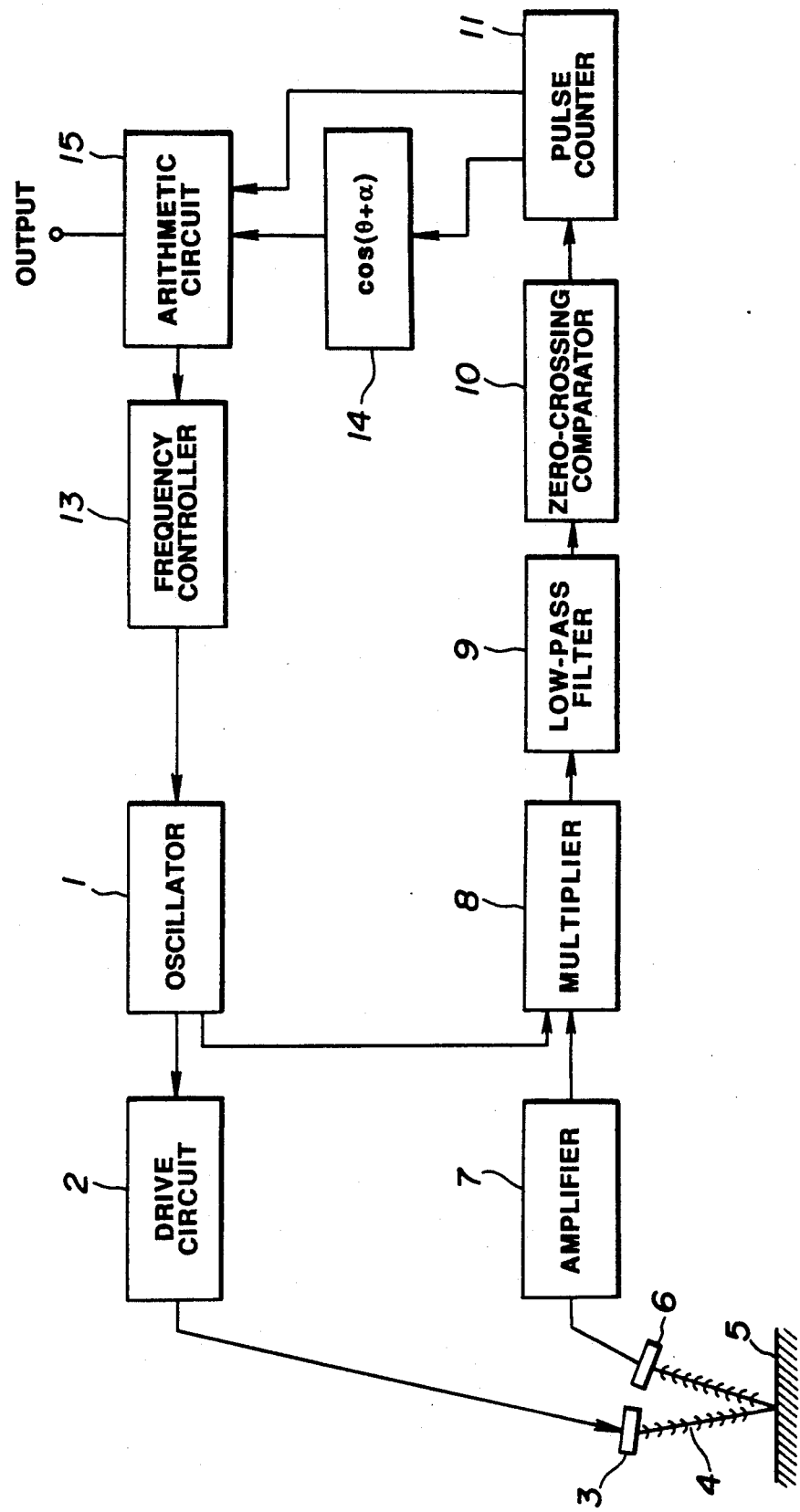
FIG. 4 is a block diagram illustrating a first embodiment of an ultrasonic Doppler ground speedometer according to the invention.

Referring now to FIG. 4, there is shown a block diagram illustrating the ultrasonic Doppler ground speedometer of the first embodiment. In the block diagram of FIG. 4, the same reference numerals used in the prior art of FIG. 1 will be applied to the corresponding elements used in the first embodiment, for the purpose of comparison between the prior art and the first embodiment. As shown in FIG. 4, the ultrasonic ground speedometer of the first embodiment comprises an oscillator 1 for generating an output signal having a particular wavelength, an ultrasonic transmitter 3 for an output ultrasonic wave, a drive circuit 2 for amplifying the oscillator output signal and for driving the transmitter 3, an ultrasonic receiver 6 for receiving a reflected ultrasonic wave caused by reflection of the output ultrasonic wave on a road surface 5 and for generating a received ultrasonic wave signal, an amplifier 7 for amplifying the received ultrasonic wave signal from the receiver 6, a multiplier 8 for deriving the frequency difference between the oscillator output signal frequency and the received ultrasonic wave signal frequency, a low-pass filter 9 for filtering undesirable noise from the frequency difference signal from the multiplier 8, a zero-crossing comparator 10 for waveform-shaping the filtered frequency difference signal representative of the Doppler shift frequency, a pulse counter 11 for deriving a Doppler shift frequency by counting pulses in the Doppler shift signal from the comparator 10, and a frequency controlling circuit 13 for controlling the oscillator output frequency in such a manner as to keep the received ultrasonic wave frequency to a constant value, in response to change in the measured ground speed of the vehicle. The ground speedometer of the first embodiment is different from the prior art shown in FIG. 1 in that the transmitter 3 and the receiver 6 are spaced apart from each other and the angle difference α is introduced into the calculation of the ground speed.

Figure 2:
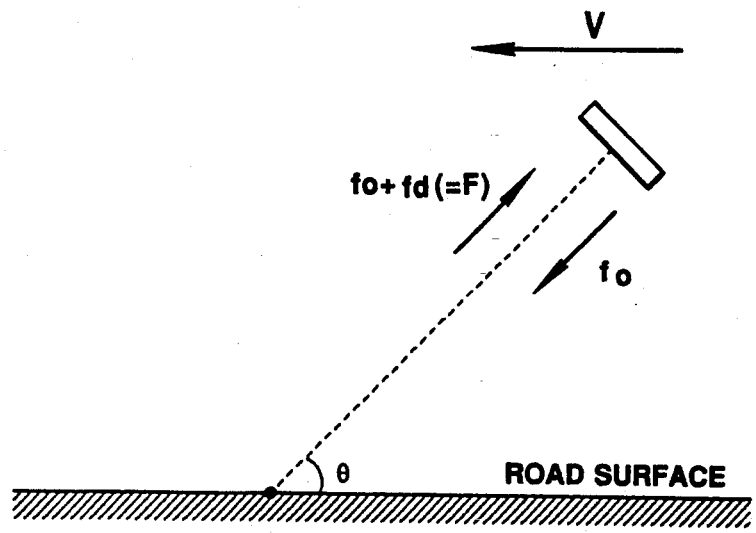
FIG. 2 is a drawing representing a principle of measuring method of the conventional ultrasonic ground speedometer of FIG. 1.
Figure 3:
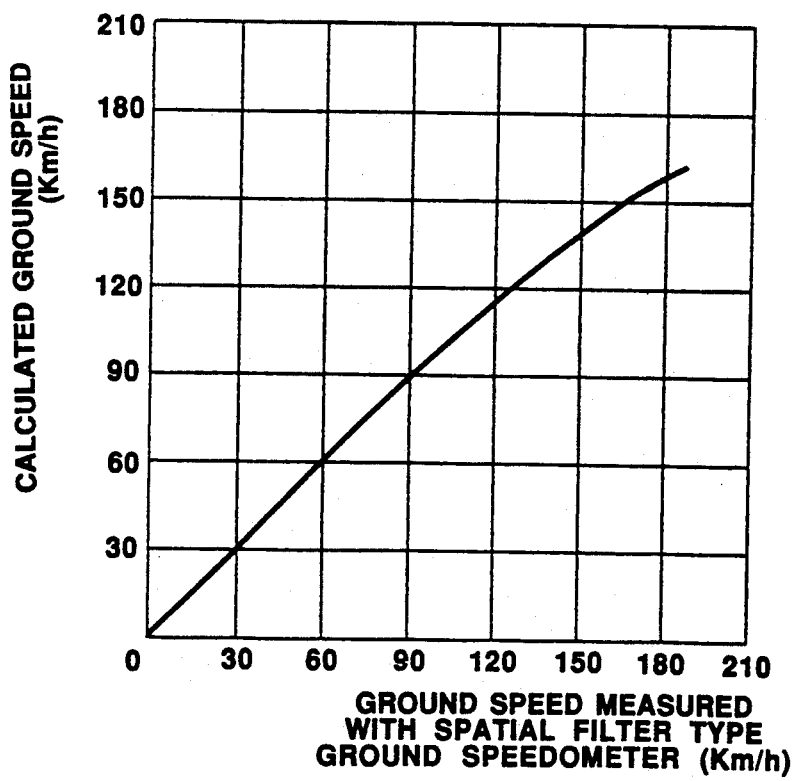
FIG. 3 is a graph illustrating a linearity of a calculated ground speed of the conventional Doppler speedometer to a ground speed measured with a spatial filter type ground speedometer.
Figure 5:
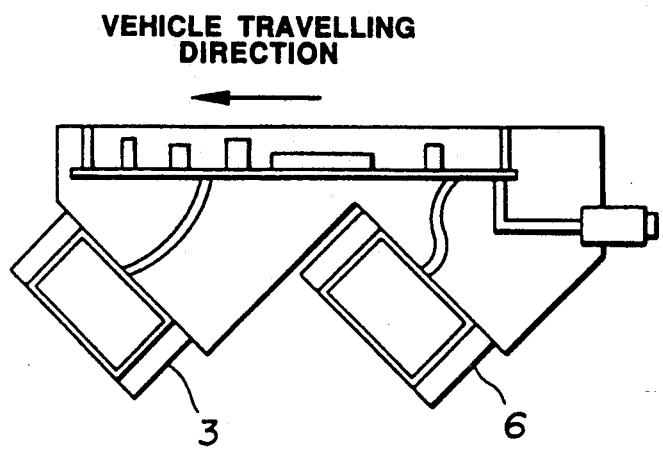
FIG. 5 is a partial enlarged view illustrating an ultrasonic transmitter and an ultrasonic receiver both employed in the ultrasonic Doppler ground speedometer of FIG. 4.

As shown in FIG. 5, the transmitter/receiver unit of the first embodiment is designed such that the receiver 6 is arranged backwardly of the transmitter 3 in the travelling direction of the vehicle. An ultrasonic wave emitting surface including the emitting point P of the transmitter 3 is inclined in the vehicle forward direction with respect to the road surface, while an ultrasonic wave reception surface including the reception point Q of the receiver 6 is also inclined in the vehicle forward direction in the same manner as the emitting surface. A high resonance characteristic ultrasonic transducer having a high Q value in the vicinity of a designated constant frequency, such as 130 kHz, is often utilized as an ultrasonic receiver, so as to enhance the. S/N ratio of the received ultrasonic wave signal generated by the receiver 6 and consequently to enhance the S/N ratio of the Doppler shift indicative signal. For example, such a resonance type ultrasonic transducer exhibits a relatively narrow directivity as shown in FIG. 6. In general, a reception sensitivity is dependent on the receiver's size and shape. In the ultrasonic receiver having a reception sensitivity characteristic shown in FIG. 6, when the reception sensitivity obtained in a direction of the central axis of the receiver is compared with the sensitivity obtained in a direction inclined from the central axis by ±10°, the latter is deteriorated by approximately 20 dB. Therefore, when the ultrasonic receiver having a relatively narrow directivity is used, it is desirable that the receiver receives the reflected ultrasonic wave substantially in a direction of the central axis of the receiver, so as to assure a high S/N ratio of the Doppler shift indicative signal. In the case of the ultrasonic transmitter/receiver arrangement of the conventional ultrasonic ground speedometer shown in FIG. 2, the receiver must receive the reflected ultrasonic wave in a direction angularly displaced from the central axis of the receiver, since the angle difference $\alpha$ is gradually increased from 0° to 20° in accordance with an increase in the vehicle speed from 0 km/h to 250 km/h. This results in a low S/N ratio of the Doppler shift indicative signal.

In view of the above, the receiver 6 is arranged backwardly of the transmitter 3 in the vehicle forward direction in consideration of the angle difference $\alpha$ varied depending on the vehicle speed, so as to insure a high reception sensitivity of the receiver.

In the first embodiment, the measuring vehicle speed range is set within a particular range of 0 km/h through 250 km/h. The distance d and the level h are determined such that the angle difference $\alpha$ becomes 0° at 125 km/h being a mean value of 0 km/h and 250 km/h. Therefore, when the vehicle speed is varied within a range of 0 km/h through 250 km/h, the angle difference $\alpha$ fluctuates within a range of −7° through 8°. With the arrangement of the ultrasonic transmitter/receiver unit of the first embodiment, it will be appreciated that the receiver receives the reflected ultrasonic wave in a direction closer to the central axis of the receiver. This insures more accurate measurement of the ground speed.

Returning to FIG. 4, the ultrasonic ground speedometer of the first embodiment also includes a memory 14 for deriving a value of $\cos(\theta+\alpha)$ on the basis of the Doppler shift frequency $f_d$ derived from the pulse counter 11 and an arithmetic circuit 15 for calculating the ground velocity v of the vehicle from the equation (3) on the basis of both the Doppler shift frequency $f_d$ derived from the pulse counter 11 and the value of $\cos(\theta+\alpha)$ derived from the memory 14. As described in detail, the memory 14 stores values of $\cos(\theta+\alpha)$ versus various Doppler shift frequencies, in the form of a data map previously derived on the basis of the $\alpha - f_d$ characteristic curve of FIG. 9.

Referring now to FIG. 7, there is shown the relationship between the reference ground speed measured by the conventional spatial filter type ground speedometer and the calculated ground speed obtained through the ultrasonic ground speedometer of the first embodiment. As appreciated from the graph of FIG. 7, the linearity of the calculated ground speed obtained according to the first embodiment to the measured ground speed obtained by the spatial filter type ground speedometer is remarkably enhanced.

As will be appreciated from the above, since in the ultrasonic ground speedometer of the first embodiment, the receiver 6 is arranged backwardly of the transmitter 3 to permit the receiver 6 to receive the reflected ultrasonic wave in a direction closer to the central axis of the receiver, and in addition the vehicle ground speed is calculated through the arithmetic circuit 15 in consideration of the angle difference $\alpha$ between the emitting angle of the output ultrasonic wave and the reception angle of the reflected ultrasonic wave, the vehicle velocity is enhanced and consequently more accurate measurement of the ground speed of the vehicle is assured.

In the first embodiment, the value of $\cos(\theta+\alpha)$ is read out from the memory 14 based on the value of the Doppler shift frequency $f_d$ derived from the pulse counter 11. Alternatively, the value of $\cos(\theta+\alpha)$ may be derived on the basis of the value of $\alpha$ calculated based on an approximate expression representative of the $\alpha - f_d$ characteristic curve, since the angle difference $\alpha$ can be represented as a function of the Doppler shift frequency $f_d$, as appreciated from FIG. 9.

Figure 9:
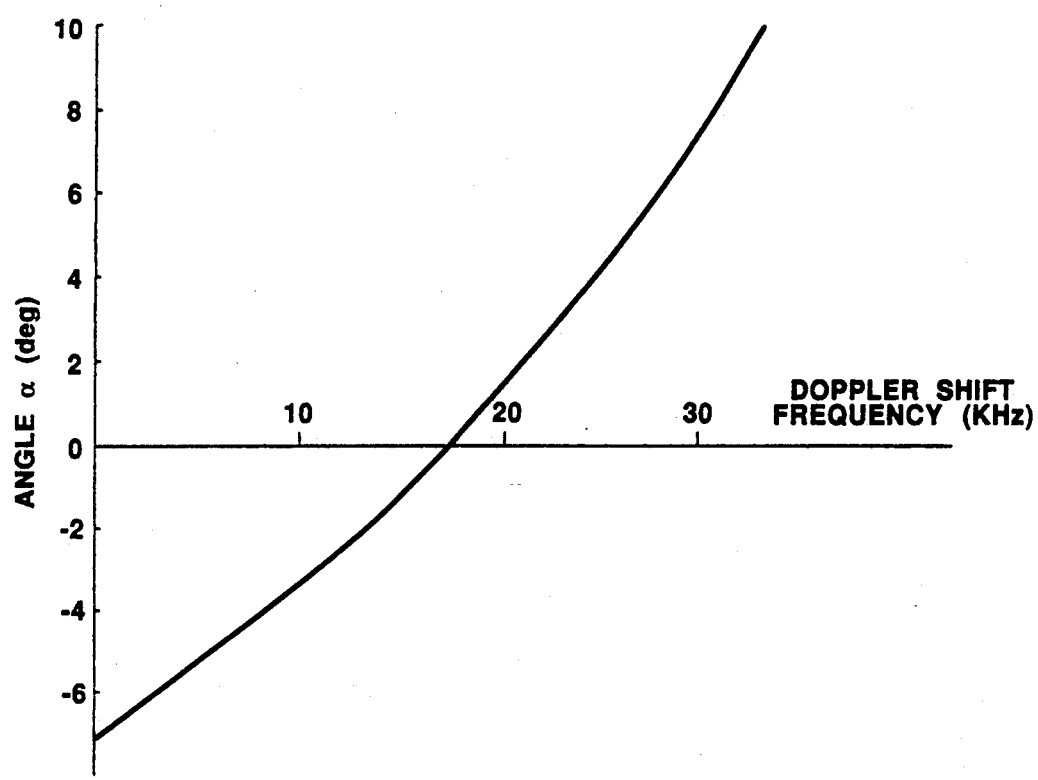
FIG. 9 is a graph illustrating a relationship between the angle difference $\alpha$ and the Doppler shift frequency.
Figure 10:
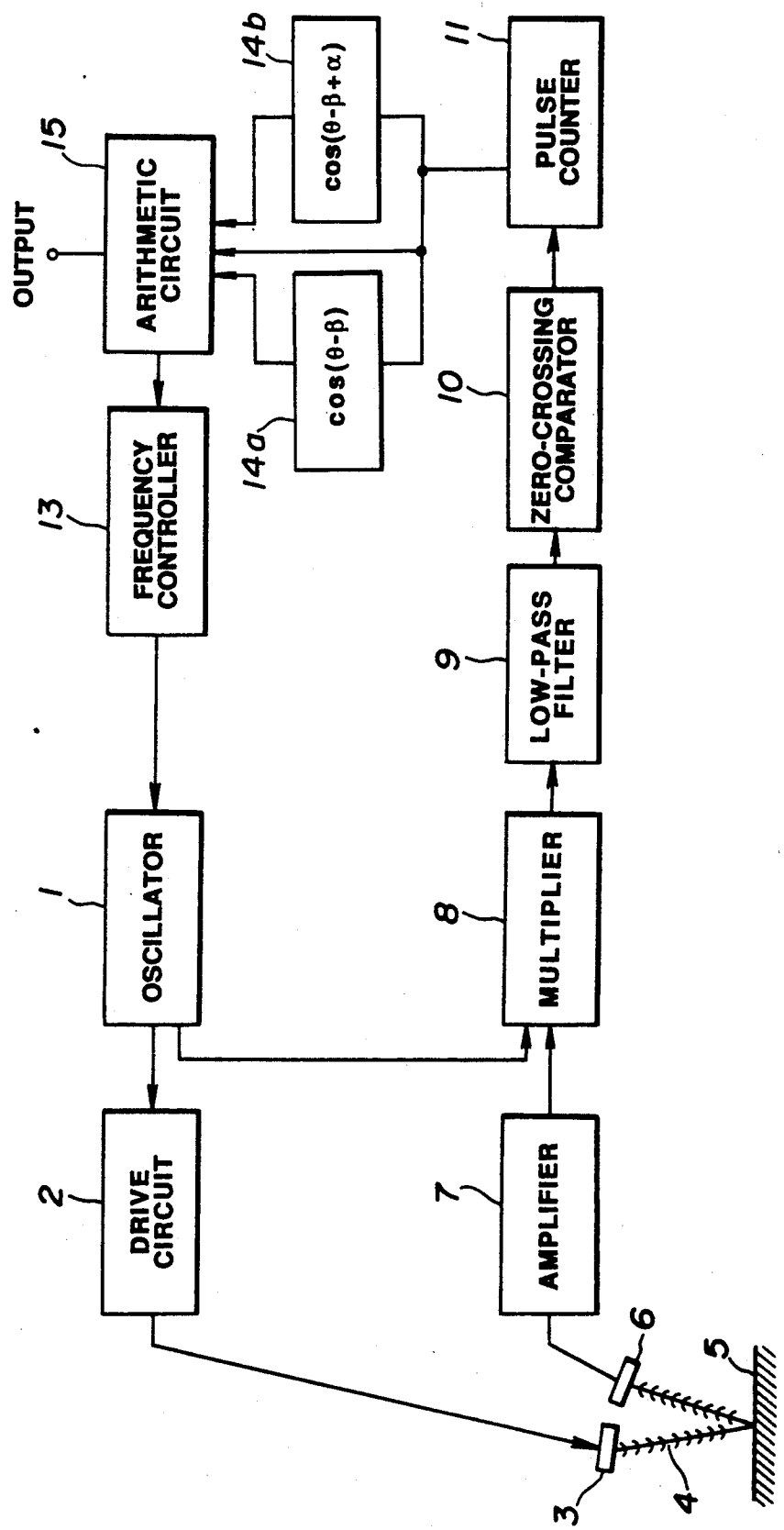
FIG. 10 is a block diagram illustrating a second embodiment of an ultrasonic Doppler ground speedometer according to the invention.

The $\alpha - f_d$ curve of FIG. 9 can be approximately represented by the following quadratic function of the Doppler shift frequency $f_d$.

$$\alpha_{deg} = 7.16 \times 10^{-3} f_d{}^2 + 2.84 \times 10^{-1} f_d - 7.18$$

wherein, the unit of the Doppler shift frequency $f_d$ is kHz.

In the Doppler ground speedometer of the first embodiment, the frequency controller 13 controls the received ultrasonic wave frequency F to be kept to a constant value, such as 130 kHz, so as to more enhance the S/N ratio of the Doppler shift signal. In this case, the Doppler shift frequency $f_d$ and the ground speed v of the vehicle are obtained by substituting $(f_o + f_d)$ into F of the equation (1), as follows.

$$f_d = v\{\cos\theta + \cos(\theta+\alpha)\} f_o/(c - v\cos\theta)$$

$$v = cf_d/\{(f_o + f_d)\cos\theta + f_d\cos(\theta+\alpha)\}$$

Second Embodiment

Figure 11:
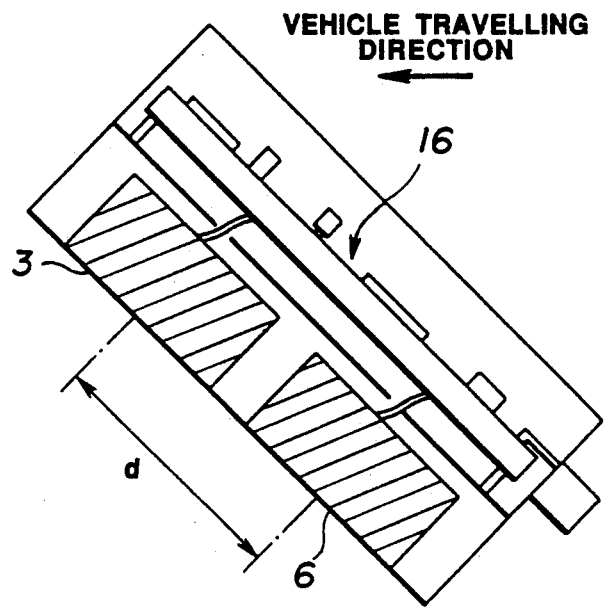
FIG. 11 is a partial enlarged view illustrating an ultrasonic transmitter and an ultrasonic receiver both employed in the ultrasonic Doppler ground speedometer of FIG. 10.
Figure 12:
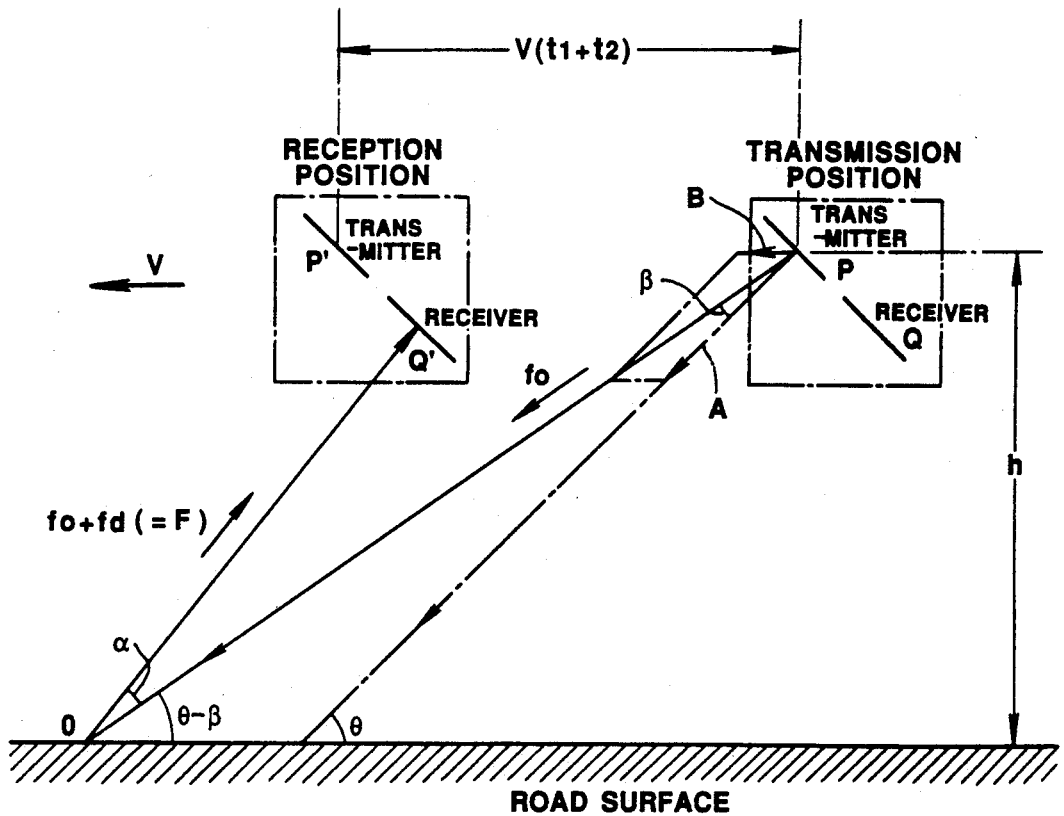
FIG. 12 is a drawing representing a principle of measuring method of the ultrasonic ground speedometer of the second embodiment.

Referring now to FIGS. 10 through 15, particularly to FIG. 12, the ultrasonic Doppler ground speedometer of the second embodiment is designed on the assumption that the emitting angle of the output ultrasonic wave generated from the transmitter is different from the reception angle of the reflected ultrasonic wave received by the receiver, and in addition the emitting angle is actually influenced by the vehicle speed. Since the second embodiment is similar to the first embodiment, the same reference numerals used in the first embodiment of FIGS. 4, 5 and 8 will be applied to the corresponding elements used in the second embodiment of FIGS. 10, 11 and 12, for the purpose of comparison between the first and second embodiments. In FIG. 12, the emitting angle $\theta$ represents an emitting angle only when the vehicle is stopped. As seen in FIG. 12, the level of the transmitter 3 is different from that of the receiver 6, and only the transmitter is set at a level h with respect to the road surface. An arrow A represents an acoustic velocity indicative vector in a vehicle stopped state, while an arrow B represents a vehicle speed indicative vector. A point O represents an actual reflection point. Assuming that the vehicle is stopped, the output ultrasonic wave emitted from the emitting point P is propagated along the broken line (or the arrow A) and reflected on the road surface with the emitting angle $\theta$. However, when the vehicle is travelling at a certain vehicle speed, the output ultrasonic wave advances in a direction determined by the sum of the two vectors A and B and reflected from an actual reflection point O on the road surface with the emitting angle slightly decreased from the emitting angle $\theta$. In the second embodiment, the angle difference $\alpha$ represents an angle between the actual emitting angle slightly reduced from the emitting angle $\theta$ obtained in the vehicle stopped state and the reception angle. On the other hand, $\beta$ represents the angle difference between an actual emitting angle obtained in the vehicle running state and a preset emitting angle $\theta$ obtained in the vehicle stopped state. As set forth above, the ultrasonic Doppler ground speedometer of the second embodiment is designed to derive the calculated ground speed in consideration of the angle difference $\beta$ as well as the angle difference $\alpha$ as considered in the first embodiment. When compared with the first embodiment, the ground speedometer of the second embodiment may provide more accurate measurement of ground speed of the vehicle.

In the ultrasonic Doppler ground speedometer of the second embodiment shown in FIG. 12, the Doppler shift frequency $f_d$ is obtained by the following equation.

$$f_d = v\{\cos(\theta-\beta)+\cos(\theta-\beta+\alpha)\}F/c + v\cos(\theta-\beta+\alpha)\} \quad (4)$$

As appreciated the above equation (4), it is necessary to determine two values of the angle differences $\alpha$ and $\beta$, in order to obtain the ground speed v from the equation (4). The two angles $\alpha$ and $\beta$ can be geometrically obtained from FIG. 12, as follows.

$$\beta = \theta - 90° + \tan^{-1}\{(v + c\cos\theta)/c\sin\theta\}$$
$$\{ch\cos(\theta - \beta) + cd\sin\theta\sin(\theta - \beta) - vh\}\sin(\theta - \beta + \alpha)$$
$$- v(h - d\cos\theta)\sin(\theta - \beta)$$
$$- c(h - d\cos\theta)\sin(\theta - \beta)\cos(\theta - \beta + \alpha) = 0$$

As appreciated from the above equation, the angle difference $\alpha$ varies depending on both the level h of the transmitter 3 and the distance d between the emitting point P and the reception point Q, in addition to the vehicle speed v. Since the Doppler shift frequency $f_d$ can be measured and calculated by the ground speedometer of the second embodiment, the ground velocity v is easily derived by determining the relationship between the angle difference $\alpha$ and the Doppler shift frequency $f_d$ and the relationship between the angle difference $\beta$ and the Doppler shift frequency $f_d$.

Figure 13:
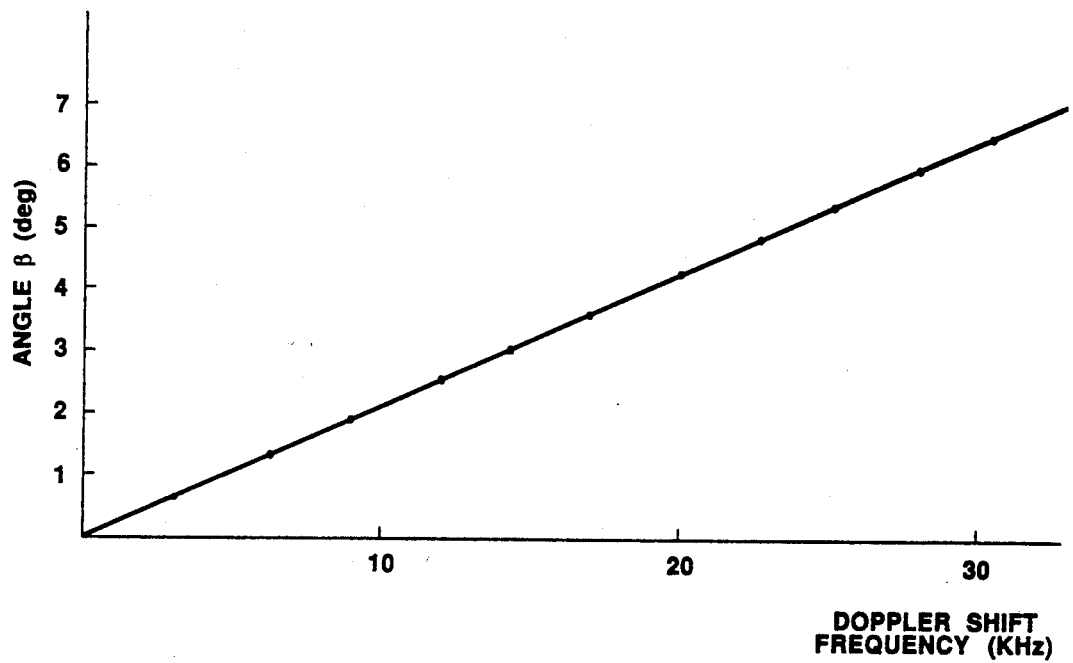
FIG. 13 is a graph illustrating a relationship between the angle difference $\beta$ and the Doppler shift frequency.
Figure 14:
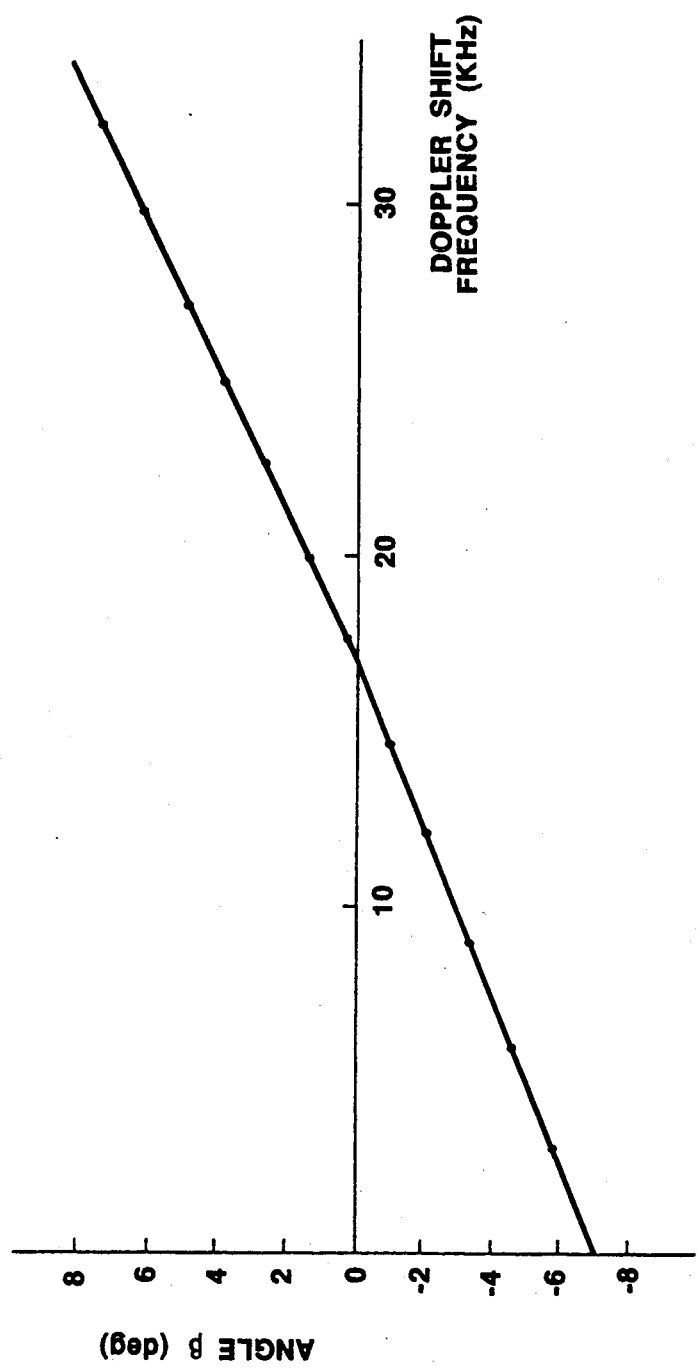
FIG. 14 is a graph illustrating a relationship between the angle difference $\alpha$ and the Doppler shift frequency.

As previously described in the first embodiment, the relationship between the angle difference $\alpha$ and the Doppler shift frequency $f_d$ is univocally determined, irrespective of change in acoustic velocity c, if the emitting angle $\theta$, the level h, the distance d and the received ultrasonic wave frequency F are preset to given values. Likewise, the relationship between the angle difference $\beta$ and the Doppler shift frequency $f_d$ is also determined, irrespective of change in acoustic velocity. These test results are assured by the inventors of the present invention. In order to experimentally obtain the angle difference data $\alpha$ and $\beta$ used in the ground speedometer of the second embodiment, tests was made under a particular condition in which the emitting angle $\theta$ obtained in the vehicle stopped state is set to 45°, the level h is set to 200 mm, the distance d between the emitting axis of the transmitter and the reception axis of the receiver is set to 35 mm, and the received ultrasonic wave frequency F is preset to 130 kHz. On the basis of the above test results, the relationship of the angle difference $\beta$ versus the Doppler shift frequency $f_d$ was obtained as shown in the graph of FIG. 13, while the relationship of the angle difference $\alpha$ versus the Doppler shift frequency $f_d$ was obtained as shown in the graph of FIG. 14. Therefore, the ground speed of the vehicle is derived from the measured Doppler shift frequency $f_d$ and the angle difference $\beta$ read out from the $\beta - f_d$ characteristic curve of FIG. 13, and the angle difference $\alpha$ read out from the $\alpha - f_d$ characteristic curve of FIG. 14, on the basis of the following equation derived from the previously noted equation (4).

$$v = cf_d / \{F\cos(\theta-\beta) + (F-f_d)\cos(\theta-\beta+\alpha)\} \quad (5)$$

Returning now to FIG. 10, there is shown a block diagram illustrating the ultrasonic Doppler ground speedometer of the second embodiment. As appreciated from comparison of the two block diagrams, namely the block diagram of the first embodiment shown in FIG. 4, and the block diagram of the second embodiment shown in FIG. 10, the construction of the first embodiment including the elements 1 through 11 and 13 is similar to that of the second embodiment. However, the second embodiment is different from the first embodiment in that the memory 14 for the value of $\cos(\theta+\alpha)$ is replaced with two memories, namely a memory 14a for the value of $\cos(\theta-\beta)$ and a memory 14b for the value of $\cos(\theta-\beta+\alpha)$, i.e., both angle differences $\alpha$ and $\beta$ are introduced into the calculation of the ground speed.

In addition to the above, as shown in FIG. 11, the transmitter/receiver unit 16 of the second embodiment is designed such that the receiver 6 is arranged backwardly of the transmitter 3 in the vehicle travelling direction, and the ultrasonic wave emitting surface including the emitting point P of the transmitter 3 and the ultrasonic wave reception surface including the reception point Q of the receiver 6 are both inclined in the vehicle forward direction with a predetermined inclination, and the previously noted emitting surface and the reception surface are both arranged on the same plane. With the above arrangement of the transmitter/receiver unit of the second embodiment, the receiver having a relatively narrow directivity shown in FIG. 6 can exhibit a high reception sensitivity, since the receiver 6 can receive the reflected ultrasonic wave in a direction closer to the central axis of the receiver. In these constructions, the S/N ratio of the Doppler shift indicative signal is enhanced and consequently more accurate measurement of ground speed is insured.

Returning to FIG. 10, the ultrasonic ground speedometer of the second embodiment includes the memories 14a and 14b, respectively deriving values of $\cos(\theta-\beta)$ and $\cos(\theta-\beta+\alpha)$ on the basis of the Doppler shift frequency $f_d$ derived from the pulse counter 11 and an arithmetic circuit 15 for calculating the ground velocity v from the equation (5) on the basis of the Doppler shift frequency $f_d$, the value of $\cos(\theta-\beta)$ derived from the memory 14a, and the value of $\cos(\theta-\beta+\alpha)$ derived from the memory 14b. As described in more detail, the memory 14a stores values of $\cos(\theta-\beta)$ versus various Doppler shift frequencies, in the form of a data map previously derived on the basis of the $\beta - f_d$ characteristic curve of FIG. 13, while the memory 14b stores values of $\cos(\theta - \beta + \alpha)$ versus various Doppler shift frequencies, in the form of a data map previously derived on the basis of the $\alpha - f_d$ characteristic curve of FIG. 14.

Figure 15:
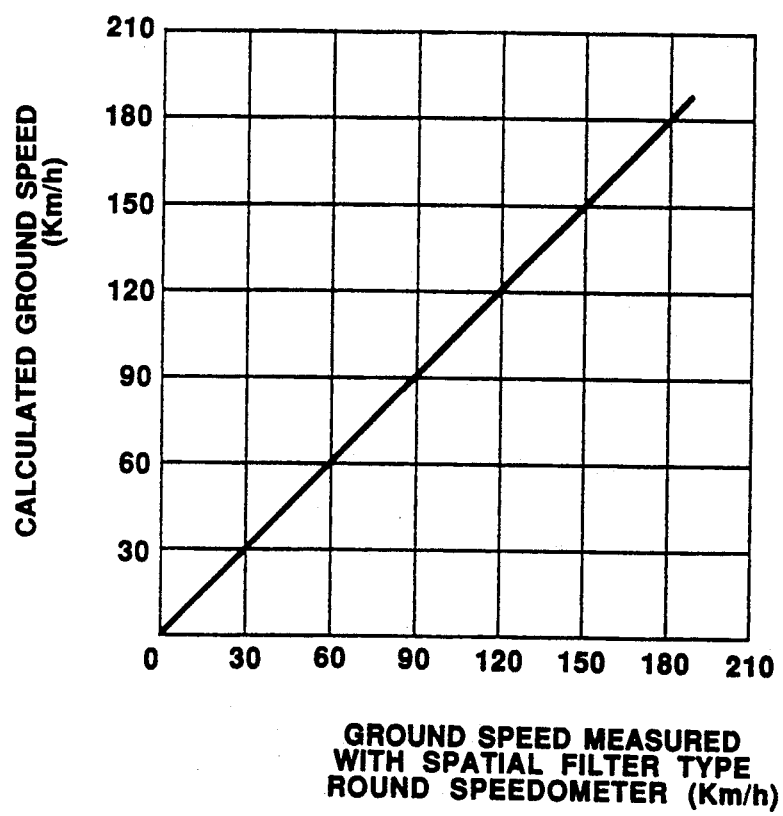
FIG. 15 is a graph illustrating a linearity of a calculated ground speed of the ultrasonic Doppler speedometer of the second embodiment to a ground speed measured with a spatial filter type ground speedometer.

Referring nov to FIG. 15, there is shown the relationship between the reference ground speed measured by the conventional spatial filter type ground speedometer and the calculated ground speed obtained through the ultrasonic ground speedometer of the second embodiment. As seen in the graph of FIG. 15, the linearity of the calculated ground speed obtained according to the second embodiment to the measured ground speed obtained by the spatial filter type ground speedometer is remarkably enhanced.

As will be appreciated from the above, the second embodiment is superior to the first embodiment, since the angle difference $\beta$ as well as the angle difference $\alpha$ is introduced into calculation of ground speed. When compared with the first embodiment, the ultrasonic Doppler ground speedometer of the second embodiment can provide more accurate measurement of ground speed of the vehicle.

Similarly to the first embodiment, the frequency controller 13 employed in the ground speedometer of the second embodiment controls the received ultrasonic wave frequency F to be kept constant, so as to more enhance the S/N ratio of the Doppler shift signal. The ground speed v are obtained by substituting ($f_o + f_d$) into F of the equation (5), as follows.

$$v = cf_d/f_o\{\cos(\theta - \beta) + \cos(\theta - \beta + \alpha) + f_d\cos(\theta - \beta)\}$$

Although it is preferable to arrange the receiver backwardly of the transmitter in the vehicle travelling direction as previously described in the first and second embodiments, the transmitter and the receiver may be arranged at the same location.

In the previously described first and second embodiments, an ultrasonic transducer, such as a piezoelectric transducer, is traditionally used as the ultrasonic transmitter or the ultrasonic receiver. As is generally known, such a piezoelectric transducer may be a piezoelectric crystal unit for converting acoustical or mechanical signals to electric signals, or vice versa. In order to provide possible highest S/N ratio for the Doppler shift indicative signal, it is preferable to utilize a high resonance characteristic ultrasonic transducer.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. An ultrasonic ground speedometer utilizing Doppler effect of ultrasonic waves, comprising:
   ultrasonic transmitting means for outputting an ultrasonic wave at an emitting angle against a road surface;
   ultrasonic receiving means for receiving a reflected ultrasonic wave caused by reflection of the output ultrasonic wave from the road surface;
   means for deriving a Doppler shift frequency between the frequencies of the output ultrasonic wave from said ultrasonic transmitting means and the reflected ultrasonic wave received by said ultrasonic receiving means;
   first arithmetic means for deriving a first angle difference between said emitting angle and a reception angle defined between the road surface and a propagation direction of the reflected ultrasonic wave received by said ultrasonic receiving means, on the basis of said Doppler shift frequency; and
   calculation means for calculating a ground speed of a vehicle mounting said ultrasonic ground speedometer, on the basis of both said Doppler shift frequency and said first angle difference.

2. The ultrasonic ground speedometer as set forth in claim 1, which further comprises second arithmetic means for compensating said emitting angle depending on said ground speed, said second arithmetic means compensating said emitting angle by a second angle difference between an actual emitting angle obtained in a vehicle running state and a preset emitting angle obtained in a vehicle stopped state.

3. The ultrasonic ground speedometer as set forth in claim 2, wherein said second arithmetic means derives said second angle difference, on the basis of said Doppler shift frequency.

4. The ultrasonic ground speedometer as set forth in claim 3, wherein said first arithmetic means derives said first angle difference based on said Doppler shift frequency from a predetermined first-angle-difference/-Doppler-shift-frequency characteristic data stored in a first memory, and said second arithmetic means derives said second angle difference based on said Doppler shift frequency from a predetermined second-angle-difference/Doppler-shift-frequency characteristic data stored in a second memory.

5. An ultrasonic ground speedometer utilizing Doppler effect of ultrasonic waves, for an automotive vehicle comprising:
   ultrasonic transmitting means for outputting an ultrasonic wave at a preset emitting angle against a road surface, in the vehicle forward direction, said preset emitting angle corresponding to an actual emitting angle obtained in a vehicle stopped state;
   ultrasonic receiving means for receiving a reflected ultrasonic wave caused by reflection of the output ultrasonic wave from the road surface;
   means for deriving a Doppler shift frequency between the frequencies of the output ultrasonic wave from said ultrasonic transmitting means and the reflected ultrasonic wave received by said ultrasonic receiving means;
   first arithmetic means for deriving a first angle difference between said preset emitting angle and a reception angle defined between the road surface and a propagation direction of the reflected ultrasonic wave received by said ultrasonic receiving means, on the basis of said Doppler shift frequency; and
   calculation means for calculating a ground speed of the vehicle mounting said ultrasonic ground speedometer, on the basis of both said Doppler shift frequency and said first angle difference.

6. The ultrasonic ground speedometer as set forth in claim 5, wherein an emitting point of said ultrasonic ransmitting means and a reception point of said ultrasonic receiving means are spaced apart from each other by a predetermined distance and said reception point of said ultrasonic receiving means is arranged backwardly of said emitting point of said ultrasonic transmitting means in the vehicle forward direction.

7. The ultrasonic ground speedometer as set forth in claim 6, wherein an ultrasonic emitting surface including said emitting point of said ultrasonic transmitting means and an ultrasonic reception surface including said reception point of said ultrasonic receiving means are both inclined in the vehicle forward direction with a predetermined inclination, and said ultrasonic reception surface is arranged backwardly of said ultrasonic emitting surface in the vehicle forward direction.

8. An ultrasonic ground speedometer utilizing Doppler effect of ultrasonic waves, for an automotive vehicle comprising:

ultrasonic transmitting means for outputting an ultrasonic wave at a preset emitting angle against a road surface, in the vehicle forward direction, said preset emitting angle corresponding to an actual emitting angle obtained in a vehicle stopped state;

ultrasonic receiving means for receiving a reflected ultrasonic wave caused by reflection of the output ultrasonic wave from the road surface;

means for deriving a Doppler shift frequency between the frequencies of the output ultrasonic wave from said ultrasonic transmitting means and the reflected ultrasonic wave received by said ultrasonic receiving means;

first arithmetic means for deriving a first angle difference between an actual emitting angle and a reception angle defined between the road surface and a propagation direction of the reflected ultrasonic wave received by said ultrasonic receiving means, on the basis of said Doppler shift frequency;

second arithmetic means for compensating said actual emitting angle depending on said ground speed, said second arithmetic means compensating said actual emitting angle by a second angle difference between said actual emitting angle obtained in a vehicle running state and a preset emitting angle obtained in a vehicle stopped state, said second arithmetic means deriving said second angle difference, on the basis of said Doppler shift frequency; and calculation means for calculating a ground speed of the vehicle mounting said ultrasonic ground speedometer, on the basis of said Doppler shift frequency, said first angle difference and said second angle difference.

9. The ultrasonic ground speedometer as set forth in claim 8, wherein an emitting point of said ultrasonic transmitting means and a reception point of said ultrasonic receiving means are spaced apart from each other by a predetermined distance and said reception point of said ultrasonic receiving means is arranged backwardly of said emitting point of said ultrasonic transmitting means in the vehicle forward direction.

10. The ultrasonic ground speedometer as set forth in claim 9, wherein an ultrasonic emitting surface including said emitting point of said ultrasonic transmitting means and an ultrasonic reception surface including said reception point of said ultrasonic receiving means are both inclined in the vehicle forward direction with a predetermined inclination, and said ultrasonic reception surface and said ultrasonic emitting surface are both arranged on the same plane.

11. The ultrasonic ground speedometer as set forth in claim 8, wherein said ultrasonic transmitting means includes an oscillator for generating the output signal having a predetermined wavelength range, an ultrasonic transducer for converting electric signals to acoustical signals and for emitting the output ultrasonic wave having said particular wavelength, and a drive circuit for amplifying the oscillator output signal and for driving said ultrasonic transducer via the amplified signal therefrom, and said ultrasonic receiving means includes an ultrasonic transducer for receiving the reflected ultrasonic wave and for converting acoustical signals to electric signals.

12. The ultrasonic ground speedometer as set forth in claim 11, wherein said ultrasonic transducer is comprised of a piezoelectric crystal unit.

13. The ultrasonic ground speedometer as set forth in claim 11, said ultrasonic transducer for said ultrasonic receiving means is comprised of a high resonance characteristic ultrasonic transducer.

* * * * *